July 31, 1962  W. WACHSMUTH  3,047,132
CONVEYOR FOR PACKING MACHINES
Filed Feb. 8, 1961  6 Sheets-Sheet 1

July 31, 1962 W. WACHSMUTH 3,047,132
CONVEYOR FOR PACKING MACHINES
Filed Feb. 8, 1961 6 Sheets-Sheet 4

July 31, 1962 W. WACHSMUTH 3,047,132
CONVEYOR FOR PACKING MACHINES
Filed Feb. 8, 1961 6 Sheets-Sheet 5

United States Patent Office 3,047,132
Patented July 31, 1962

3,047,132
CONVEYOR FOR PACKING MACHINES
Willi Wachsmuth, Hamburg-Bergedorf, Germany, assignor to Hauni-Werke Körber & Co. K.G., Hamburg-Bergedorf, Germany
Filed Feb. 8, 1961, Ser. No. 87,915
Claims priority, application Germany Feb. 10, 1960
4 Claims. (Cl. 198—221)

The present invention relates to improvements in a conveyor for packing machines, and particularly is directed to a conveyor provided with adjustable dogs thereon which are controlled in such a manner that the dogs are movable in a predetermined rhythm in and out of the range of the path of movement of the package conveyed by the machine.

It is an object of the present invention to arrange the dogs on a conveyor carriage which is relatively movable toward and away from a control carriage.

Another object of the invention is to operate the conveyor carriage and the control carriage by a common drive by means of connecting rods which are offset relatively to one another.

Still another object of the invention is to make the dogs integral with links which are provided with rollers which are guided in slots of a common control bar.

The drawings disclose by way of example an embodiment of the invention:

Figure 1:
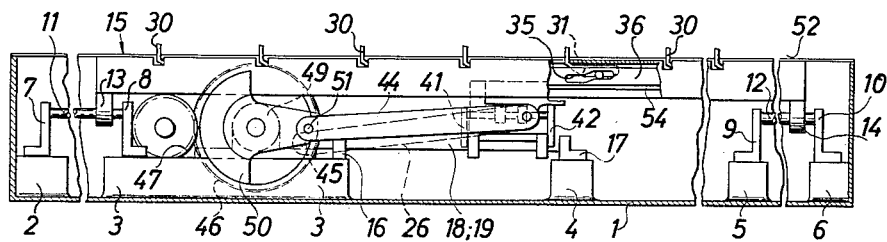
FIG. 1 shows a side elevation view of the conveyor device.

Referring to the drawings, the conveyor consists of a base frame 1 to which are attached the bearing blocks 2, 3, 4, 5 and 6. The bearing blocks 2, 3, 5 and 6 carry brackets 7, 8, 9 and 10, namely two for each of the guide rods 11 and 12 which are arranged at both ends of the base frame 1. Bushings 13 and 14 are slidably mounted on the guide rods 11 and 12. These bushings 13, 14 are fastened to the end of a U-shaped support 15 which carries the dogs 30 for moving the articles to be packed along the conveyor path. Another bracket 16 is provided at the other end of the bearing block 3, and the bearing block 4 carries a bracket 17. Two parallel guide rods 18 and 19 are carried by these brackets 16 and 17. A conveyor carriage 20 for the U-shaped support 15 is slidably mounted on these rods by means of bushings 21, 22, 23 and 24 (see FIGS. 2 and 3).

Figure 2:
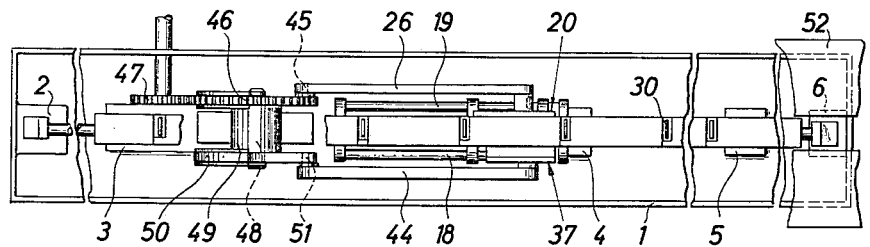
FIG. 2 shows a top view of the conveyor device according to FIG. 1.
Figure 3:
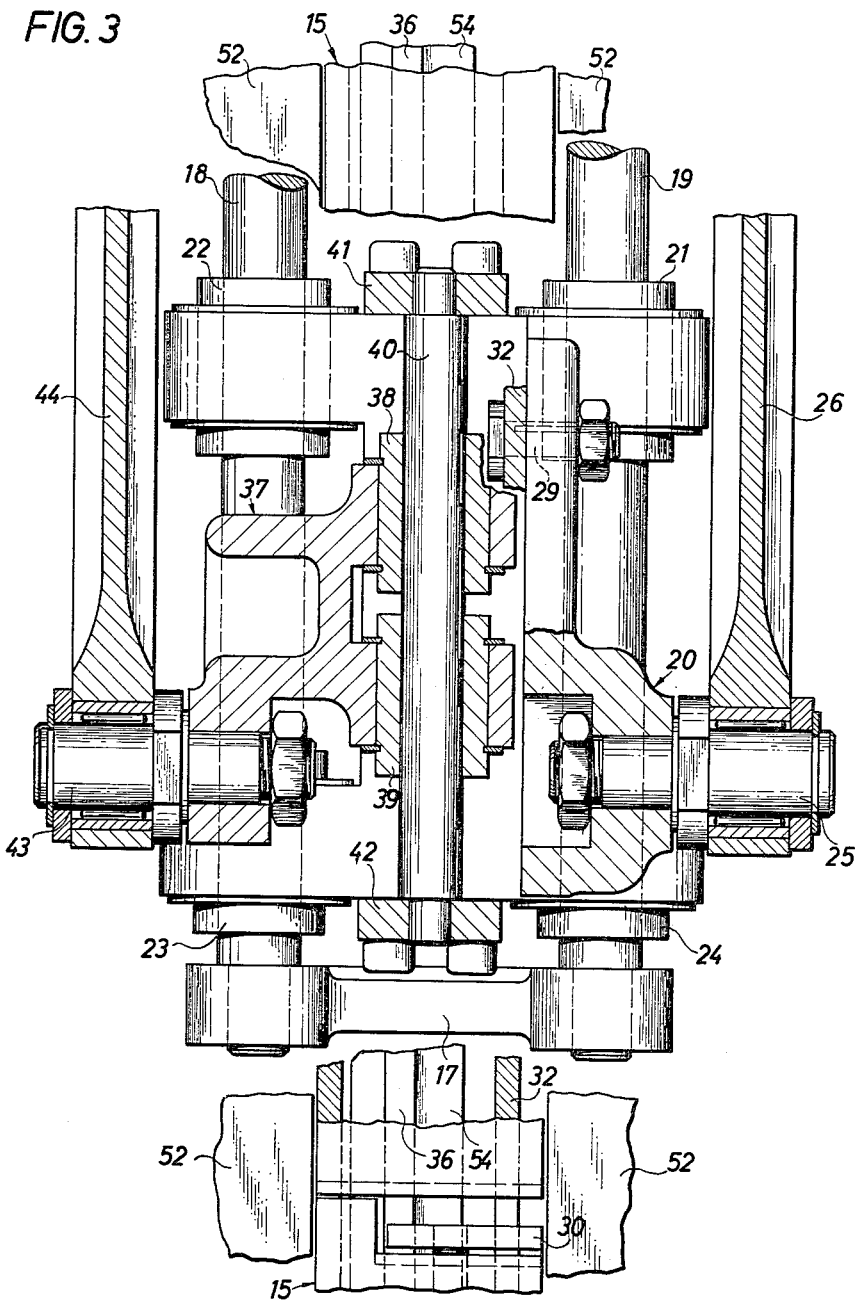
FIG. 3 shows an enlarged top view of one part of the conveyor device shown in FIG. 2 with the conveyor and the control carriages.
Figure 4:
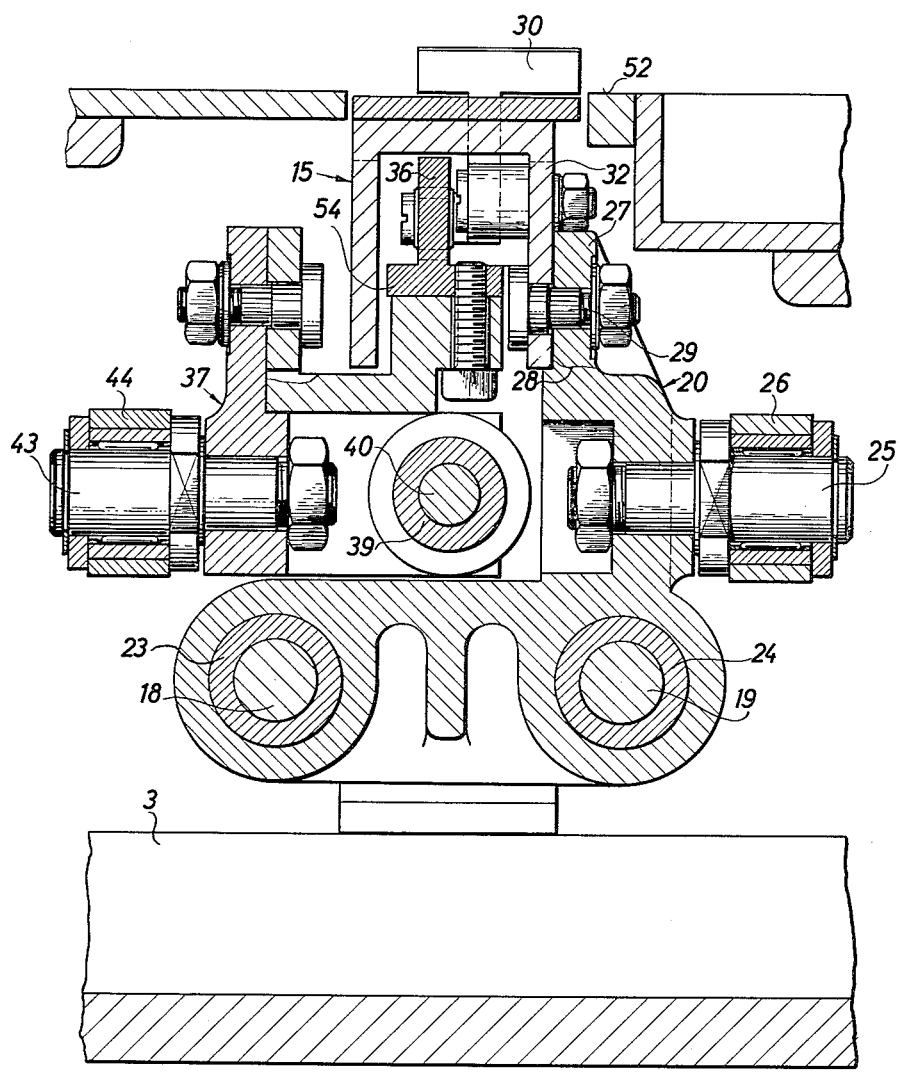
FIG. 4 shows the cross-sectional view of the carriages.

The conveyor carriage 20 has a profile as shown in FIG. 4. At one side of this carriage 20 is provided a bolt 25 to which is attached one end of a connecting rod 26 (FIG. 2). According to FIG. 4, there is indicated above the bolt 25, but disposed in a rearward plane, as shown by the broken line 28, a screw 29 on a portion of the carriage 27. This screw 29 as well as a still further backwardly arranged second screw are positioned adjustably in longitudinal slots and are used for adjusting the U-shaped support 15 which latter is provided for carrying the dogs 30 for transporting the packages. The dogs 30 therefore are adjustable on the conveyor carriage 20.

Figure 5:
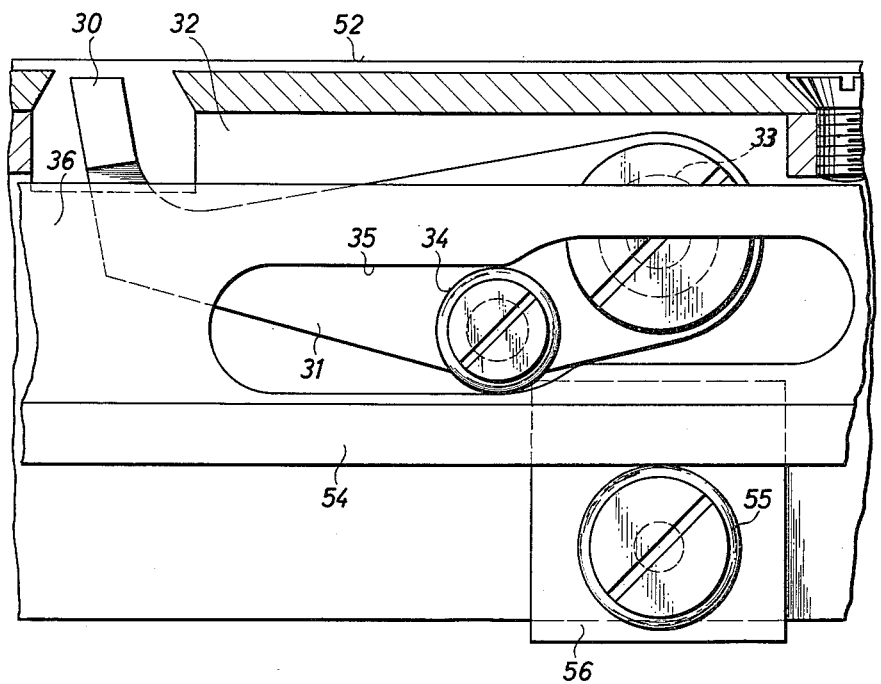
FIG. 5 shows an enlarged view of a portion of the control bar of the conveyor carriage and a dog in a withdrawn or inoperative position.
Figure 6:
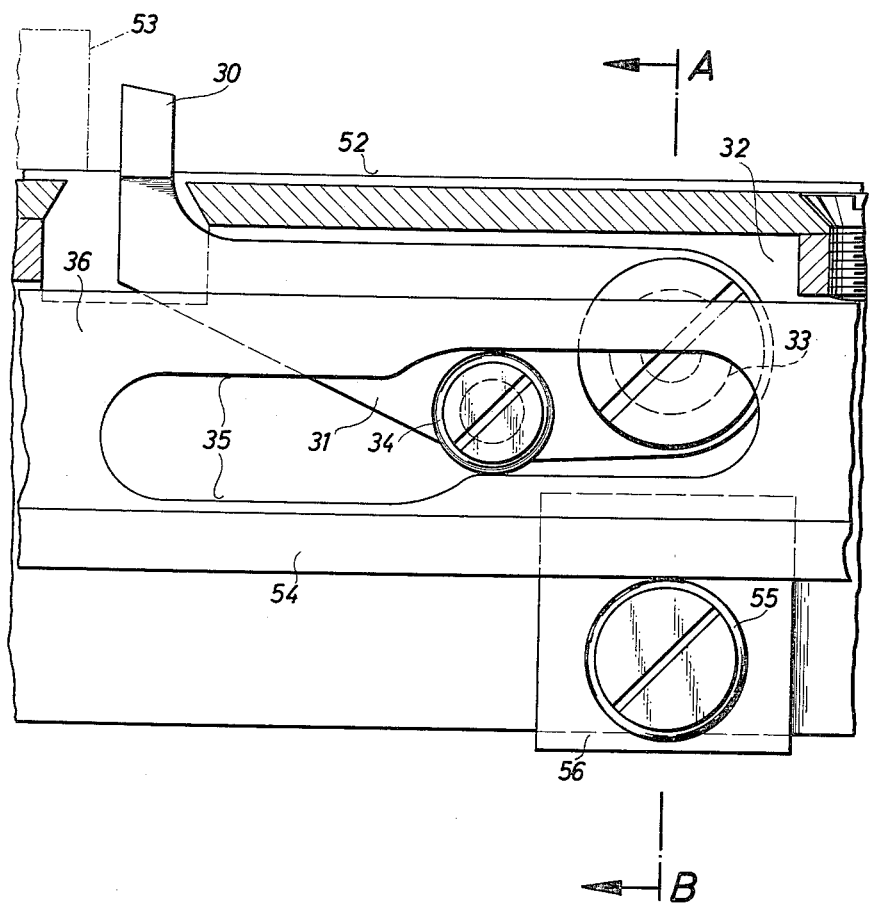
FIG. 6 shows a view similar to that of FIG. 5, but with the dog in raised or operative position.
Figure 7:
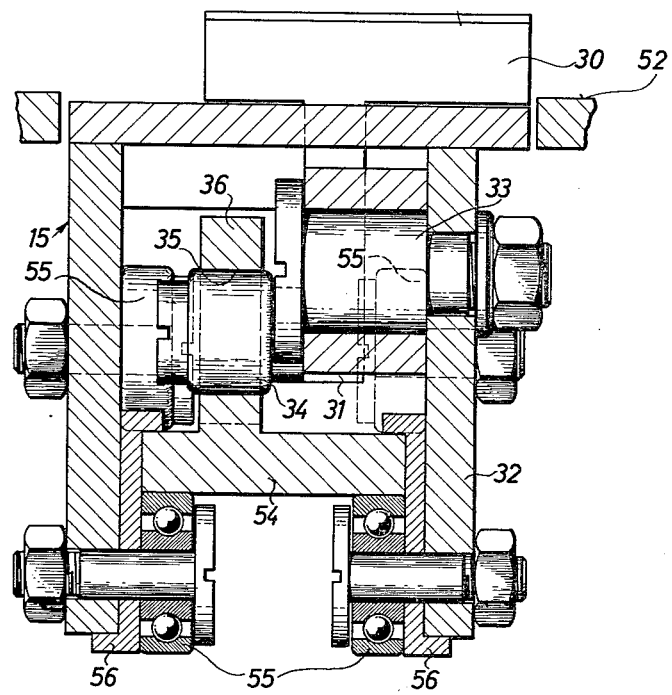
FIG. 7 shows a sectional view of the conveyor device along the line A—B of FIG. 6.
Figure 8:
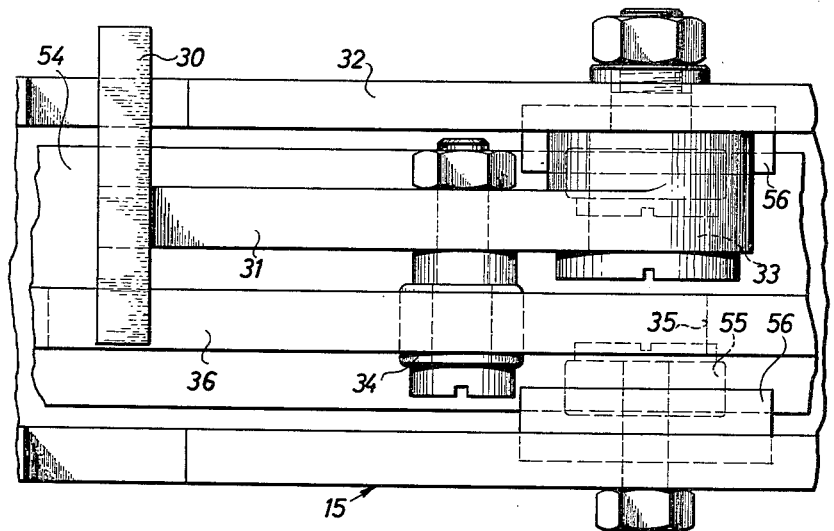
FIG. 8 shows a top view of the conveyor device according to FIG. 6 in which the parts controlling and covering the dog have been removed.

The dogs 30 are pivotally mounted in the required intervals (FIG. 1), and form a part of the links 31 (FIGS. 5, 6) the ends opposite of the dogs 30 of which (FIGS. 7 and 8) are pivotally mounted on bolts 33 attached to the wall 32 of the U-shaped support 15. Rollers 34 are provided on the links 31 between the ends thereof and extend into slots 35 which are somewhat offset and are arranged in the control rail 36 which controls all of the links 31. For each of the rollers 34 on each of the dogs 30, 31 is provided a corresponding slot 35. The control rail 36 is attached to a control carriage 37 (FIG. 4), which carries the bushings 38, 39 (FIG. 3), which latter slide along a guide rod 40. The guide rod 40 is fastened in the side walls 41, 42 of the conveyor carriage 20. A bolt 43 is provided by the control carriage 37 corresponding to the bolt 25 provided on the conveyor carriage 20. A connecting rod 44 is attached to said bolt 43 which corresponds to the similar connecting rod 26 of the conveyor carriage. The connecting rod 26 of the carriage 20 is according to FIGS. 1 and 2 rotatable about a bolt 45 which is fastened to the gear wheel 46 which serves as a crank. This gear wheel 46 is driven by an intermediate gear 47 from the main drive of the machine. The gear wheel 46 is driven by a shaft 48 supported in a bearing 49 attached to the bearing block 3. A crank 50 is attached to the free end of the shaft 48 and the crank is adjusted in such a manner that its crank pin 51 is displaced an angle of 15° relative to the bolt 45 of the crank 26. The connecting rod 44 for the control carriage 37 is swingable about the pivot bolt 51. The control carriage 37 is provided with a guide rail 54 (FIG. 7), which carries the control rail 36. Rollers 55 are distributed along the entire length of the guide rail 54 (FIGS. 5 and 6) on which rollers the guide rail 54 is adapted to move back and forth. Furthermore, there are provided Z-shaped guides 56 which limit the lateral movement of the guide rail 54 and also its movement in an upward direction.

The operation of the conveyor is as follows:

The U-shaped support 15 which is horizontally movable back and forth on the guide rods 11 and 12 (FIGS. 1 and 2) is displaced back and forth together with the dogs 30 by the conveyor carriage 20, which is movable back and forth on the guide rods 18 and 19 during each revolution of the gear wheel 46 acting as a crank by means of the bolt 45 and the connecting rod 26. At the same time the control carriage 37 with the guide rail 36 fastened to the carriage is moved back and forth by the crank 50, the bolt 51 and the connecting rod 44 on the guide rod 40 which latter is attached to the conveyor carriage 20.

Due to the displacement of the bolt 45 relative to the bolt 51, the control rail 36 of the control carriage 37 will perform a relative movement with respect to the U-shaped support 15 of the conveyor carriage 20. As a result of this relative movement the guide roller 34 on the dog 30, or rather on the link 31, will be moved back and forth in the offset slot 35 of the control rail 36 and will thereby swing the dog 30 up and down (see FIGS. 5 and 6). The adjustment of the dog 30 takes place in such a manner that the dog 30 will be swung upwardly a short distance in rear of the package 53 (FIG. 6) on the packing path 52. Since this upward swinging movement is effected in advance of the movement of the conveyor carriage 20, the speed at which the dog will engage the package 53 is very small.

What I claim is:

1. In a conveyor for packing machines, a plurality of adjustable dogs for engaging and moving the packages, and means for controlling the adjustment of said dogs in such a manner that same are movable into and out of the packing path in the rhythm of the machine, said means including a conveyor carriage on which said dog is pivotally mounted, a control carriage for controlling the adjustment of said dog, and means for moving said conveyor carriage relatively to said control carriage along parallel paths.

2. In a conveyor for packing machines, a plurality of adjustable dogs for engaging and moving the packages, and means for controlling the adjustment of said dogs in such a manner that same are movable into and out of the packing path in the rhythm of the machine, said means including a conveyor carriage on which said dog is pivotally mounted, a control carriage, and means for moving said conveyor carriage relatively to said control carriage, said last mentioned means including a common drive for said conveyor carriage and said control carriage and connecting rods separately connecting said two carriages with said common drive, said connecting rods being arranged to effect a relative back and forth movement of said two carriages when said common drive is operated.

3. In a conveyor for packing machines, a plurality of adjustable dogs for engaging and moving the packages, and means for controlling the adjustment of said dogs in such a manner that same are movable into and out of the packing path in the rhythm of the machine, said means including a conveyor carriage on which said dog is pivotally mounted, a control carriage, and means for moving said conveyor carriage relatively to said control carriage, each dog forming a part of a link pivotally mounted at one end to said conveyor carriage, a roller on said link, and a common control bar for all of said links and provided with cam slots, one for each said roller and into which said rollers extend.

4. In a conveyor for packing machines, a plurality of adjustable dogs for engaging and moving the packages, and means for controlling the adjustment of said dogs in such a manner that same are movable into and out of the packing path in the rhythm of the machine, said means including a conveyor carriage on which said dog is pivotally mounted, a control carriage, and means for moving said conveyor carriage relatively to said control carriage, each dog forming a part of a link pivotally mounted at one end to said conveyor carriage, a roller on said link, and a common control bar for all of said links and provided with cam slots, one for each said roller and into which said rollers extend, and means for operating said control bar by said control carriage.

References Cited in the file of this patent
UNITED STATES PATENTS
2,193,918    Chalmers et al. _____ Mar. 19, 1940